US008356860B2

(12) United States Patent
Nakaya et al.

(10) Patent No.: US 8,356,860 B2
(45) Date of Patent: Jan. 22, 2013

(54) SEAT DEVICE FOR VEHICLE

(75) Inventors: Kouichi Nakaya, Hiroshima (JP); Akihiro Kobayashi, Hiroshima (JP)

(73) Assignee: Mazda Motor Corporation (JP)

( * ) Notice: Subject to any disclaimer, the term of this patent is extended or adjusted under 35 U.S.C. 154(b) by 161 days.

(21) Appl. No.: 12/905,286

(22) Filed: Oct. 15, 2010

(65) Prior Publication Data

US 2011/0109132 A1    May 12, 2011

(30) Foreign Application Priority Data

Nov. 12, 2009  (JP) ................................ 2009-259158

(51) Int. Cl.
*B60N 2/42* (2006.01)
*B60N 2/427* (2006.01)
*B60N 2/48* (2006.01)
*B60N 2/36* (2006.01)
*B60R 21/055* (2006.01)

(52) U.S. Cl. ..................... 297/216.12; 297/14
(58) Field of Classification Search ............ 297/14, 297/216.12
See application file for complete search history.

(56) References Cited

U.S. PATENT DOCUMENTS

| | | | | |
|---|---|---|---|---|
| 3,186,763 A | * | 6/1965 | Ferrara | 297/216.12 X |
| 4,123,104 A | * | 10/1978 | Andres et al. | 297/216.12 X |
| 6,840,560 B2 | * | 1/2005 | Flogard | 297/216.12 X |
| 2012/0032480 A1 | * | 2/2012 | Orzelski | 297/216.12 |

FOREIGN PATENT DOCUMENTS

| | | |
|---|---|---|
| DE | 196 29 964 A1 | 1/1998 |
| DE | 299 15 719 U1 | 1/2001 |
| DE | 101 13 091 A1 | 10/2002 |
| EP | 0 888 926 A1 | 1/1999 |
| GB | 2 418 843 A | 4/2006 |
| JP | 2008-273445 A | 11/2008 |

OTHER PUBLICATIONS

The Extended European Search Report dated Jan. 13, 2011; Application No. 10014204.1-2424.

* cited by examiner

*Primary Examiner* — Rodney B White
(74) *Attorney, Agent, or Firm* — Studebaker & Brackett PC; Donald R. Studebaker

(57) ABSTRACT

A seat device for a vehicle comprises a seat for a passenger including seatbacks to support a passenger's back portion, reinforcing structure bodies provided inside the seatbacks along an outer periphery of the seatbacks, headrests provided at upper portions of the reinforcing structure bodies to support a passenger's head portion, connection support portions provided beside the reinforcing structure bodies to connect the reinforcing structure bodies to a vehicle-body member, and move-allowance portions to allow lower portions of the reinforcing structure bodies to move rearwardly in a vehicle rear collision so that the headrests move forwardly or upwardly. Accordingly, a passenger's head portion can be protected effectively with a simple structure.

10 Claims, 10 Drawing Sheets

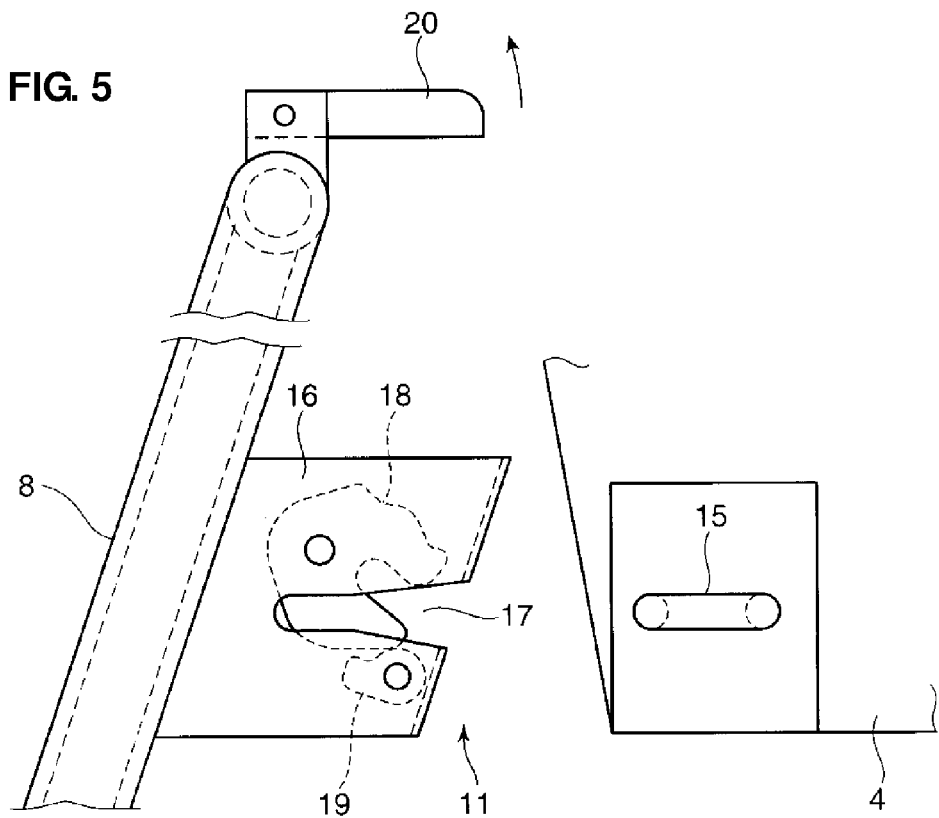
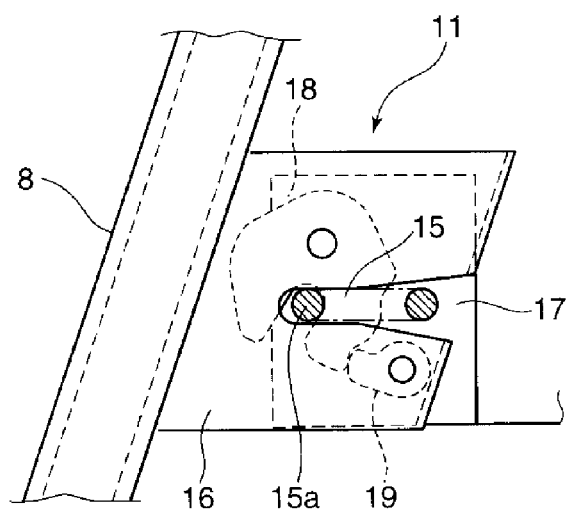

SEAT DEVICE FOR VEHICLE

BACKGROUND OF THE INVENTION

The present invention relates to a seat device for a vehicle which is installed in a vehicle compartment of the vehicle.

Conventionally, vehicles, such as automotive vehicles, have been developed so that a headrest of a seat is controlled so as to move forwardly in a vehicle rear collision and thereby a passenger's head portion is supported effectively by restraining its rearward move, so that the passenger's head portion can be properly protected.

Japanese Patent Laid-Open Publication No. 2008-273445, for example, discloses a seat device, in which behind a seatback to support a passenger's back portion are arranged a rear parcel shelf and a rear parcel trim which covers the rear parcel shelf, a headrest support portion projects forwardly from a front face of the rear parcel trim, and a spring is provided between the rear parcel shelf and the seatback so that the seatback is supported at the rear parcel shelf via the spring. According to this seat device, in the vehicle rear collision, the headrest can be restrained from moving rearwardly by the headrest support portion contacting the headrest, whereas the seatback moves rearwardly, compressing the spring, and the headrest moves forwardly relatively to the seatback. Consequently, the amount of rearward move of the passenger's head portion relative to the passenger's back portion can be properly decreased.

However, the seat device disclosed in the above-described publication has a problem in that since a headrest reclining device is provided at a rear parcel, good appearances would be deteriorate, and a layout flexibility of the rear parcel or the headrest would be restricted to some extent.

SUMMARY OF THE INVENTION

The present invention has been devised in view of the above-described problem, and an object of the present invention is to provide a seat device for a vehicle which can protect the passenger's head portion effectively with a simple structure, without deteriorating good appearances.

According to the present invention, there is provided a device for a vehicle, comprising a seat for a passenger, the seat including a seatback to support a passenger's back portion, a reinforcing structure body provided inside the seatback for a passenger along an outer periphery of the seatback, a headrest provided at an upper portion of the reinforcing structure body to support a passenger's head portion, a connection support portion provided beside the reinforcing structure body to connect the reinforcing structure body to a vehicle-body member so as to support the reinforcing structure body at the vehicle-body member, and a move-allowance portion allowing a lower portion of the reinforcing structure body to move rearwardly in a vehicle rear collision so that the headrest moves forwardly or upwardly.

According to the present invention, the passenger's head portion can be protected effectively with a simple structure, without deteriorating good appearances. That is, since there are provided the connection support portion and the move-allowance portion, when a pressure-receiving portion provided at a lower portion of the reinforcing structure body is pressed rearwardly by the back portion of the passenger seated in the seat for a passenger, the reinforcing structure body is moved so as to swing, so that the headrest can be securely moved forwardly or upwardly. Thereby, the passenger's head portion can be restrained effectively from moving rearwardly with the simple structure. Further, good appearances may not be deteriorated, and the flexibility of layout may not be restricted, either. Thus, the present invention is applicable to any vehicle in which the above-described rear parcel is not provided, and the design flexibility can be secured.

According to an embodiment of the present invention, the reinforcing structure body is supported on a vehicle-body side via a pivot portion of the seatback, and the move-allowance portion is provided at the pivot portion. Thereby, since the seatback swings around the pivot portion in a normal state, it can be moved so as to take its folding state and its standing state. In the vehicle rear collision, meanwhile, since the lower portion of the reinforcing structure body is moved rearwardly along the move-allowance portion provided at the pivot portion by a pressing force acting on the above-described pressure-receiving portion, the headrest can be securely moved forwardly or upwardly with a simple structure, so that the passenger's head portion can be protected effectively.

According to another embodiment of the present invention, the connection support portion comprises a striker which is provided at any one of the reinforcing structure body and the vehicle-body member and a lock bracket which is provided at the other of those. Thereby, the connection support portion can be made at a low cost by using goods on the market, and the reinforcing structure body and the vehicle-body member can be connected to each other easily and properly via the connection support portion. Herein, the lock bracket may comprise a slot to receive the striker, a latch to hold the striker in the slot, and a lock portion to lock the latch at a holding position of the striker.

According to another embodiment of the present invention, the connection support portion comprises a first connection support portion to connect the reinforcing structure body to a vehicle-body wall portion so as to support the reinforcing structure body at the vehicle-body wall portion and a second connection support portion to connect the reinforcing structure body to a floor panel so as to support the reinforcing structure body at the floor panel, the first and second connection portions being arranged beside the reinforcing structure body on the opposite sides to each other in a vehicle width direction. Thereby, since the other side portion of the reinforcing structure body which is not supported at the vehicle-body wall portion is supported at the floor panel via the second connection support portion, the reinforcing structure body can be stably supported at its both side portions. Further, the reinforcing structure body can be moved smoothly by the pressing force acting on the pressure-receiving portion. Accordingly, the headrest can be more securely moved forwardly or upwardly, so that the passenger's head portion can be protected more effectively.

According to another embodiment of the present invention, the reinforcing structure body is supported at the floor panel via a pivot portion of the seatback, and the second connection support portion is supported at the floor panel via the pivot portion. Thereby, the seatback of the seat for a passenger can be supported so as to swing via the pivot portion by using the second connection support portion, and the other side portion of the reinforcing structure body which is not supported at the vehicle-body wall portion can be supported stably and with a simple structure via the second connection support portion.

According to another embodiment of the present invention, the move-allowance portion is provided at the second connection support portion. Thereby, the reinforcing structure body can be supported stably via the second connection support portion in the normal state. In the vehicle rear collision, the lower portion of the reinforcing structure body is allowed to move rearwardly so that the headrest can be securely moved forwardly or upwardly. Consequently, the passenger's head portion can be protected more effectively.

According to another embodiment of the present invention, the connection support portion comprises a first connection support portion to connect the reinforcing structure body to a vehicle-body side wall portion so as to support the reinforcing structure body at the vehicle-body side wall portion and a second connection support portion to connect the reinforcing structure body to a rear package tray arranged in back of the seat for a passenger so as to support the reinforcing structure body at the rear package tray. Thereby, the reinforcing structure body can be stably supported by using the rear package tray, and the smooth swing move of the reinforcing structure body by the pressing force acing on the pressure-receiving portion can be obtained.

Other features, aspects, and advantages of the present invention will become apparent from the following description which refers to the accompanying drawings.

BRIEF DESCRIPTION OF THE DRAWINGS

FIG. 5 is an explanatory view showing a detachment state of a connection support portion.

FIG. 6 is an explanatory view showing a connection state of the connection support portion.

DETAILED DESCRIPTION OF THE INVENTION

Hereinafter, preferred embodiments of the present invention will be described referring to the accompanying drawings.

Embodiment 1

Figure 1:
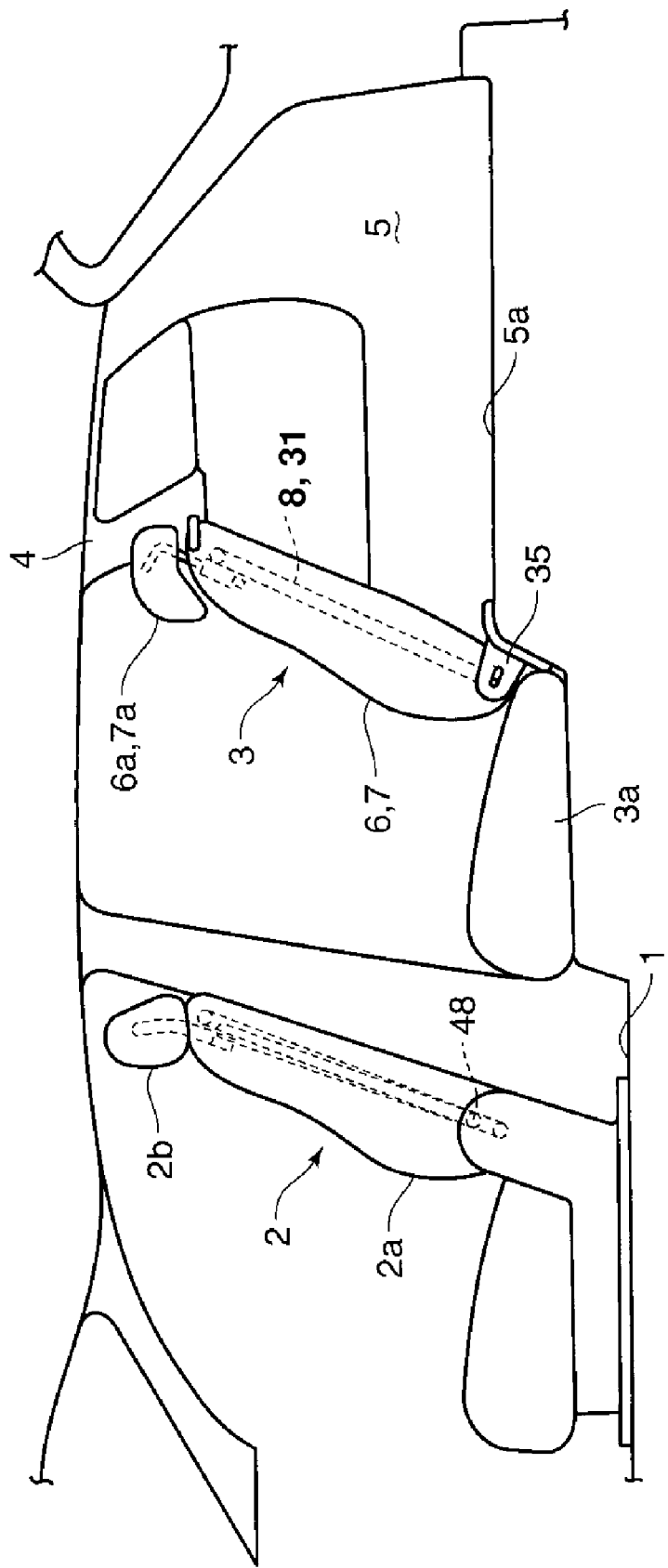
FIG. 1 is a side view showing a schematic structure of a vehicle equipped with a seat device for a vehicle according to a first embodiment of the present invention.
Figure 2:
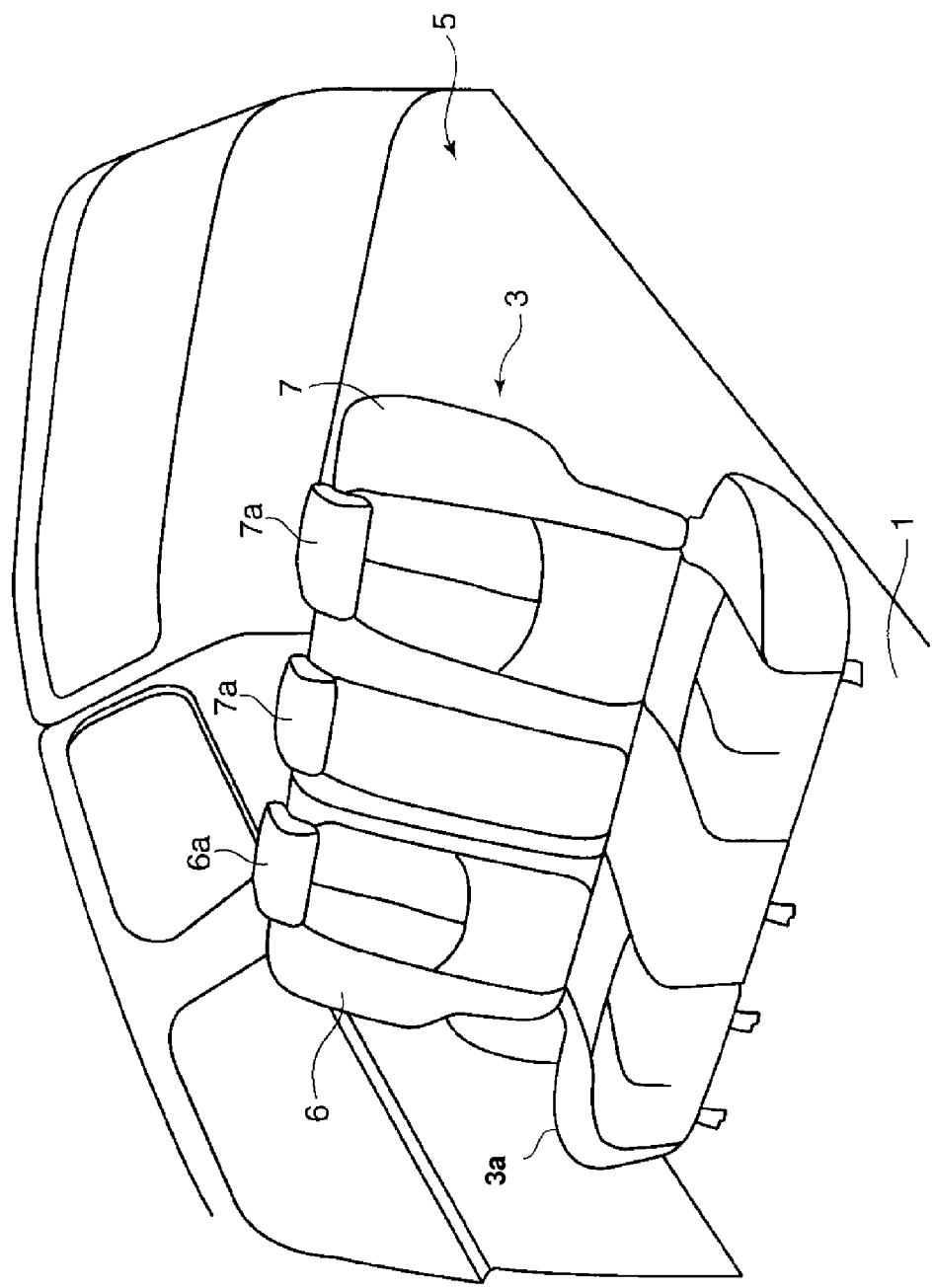
FIG. 2 is a perspective view showing an interior structure of the vehicle.

FIGS. 1 and 2 show an interior structure of a vehicle equipped with a seat device for a vehicle according to a first embodiment of the present invention. A front-row seat 2, which comprises a driver's seat and an assistant's seat, is provided on a floor panel 1 which forms a bottom portion of a vehicle compartment of the vehicle. Behind this seat 2 is arranged a rear-row seat for a passenger 3 which constitutes the seat device for a vehicle of the present invention. A vehicle-body wall portion 4 (side wall) which is comprised of a side panel of the vehicle is provided on an outward side of the seat for a passenger 3. A baggage room 5 is formed in back of the seat for a passenger 3, and its bottom portion 5a is provided so as to extend rearwardly from a specified position near a lower end portion of a seatback of the seat for a passenger 3.

Figure 3:
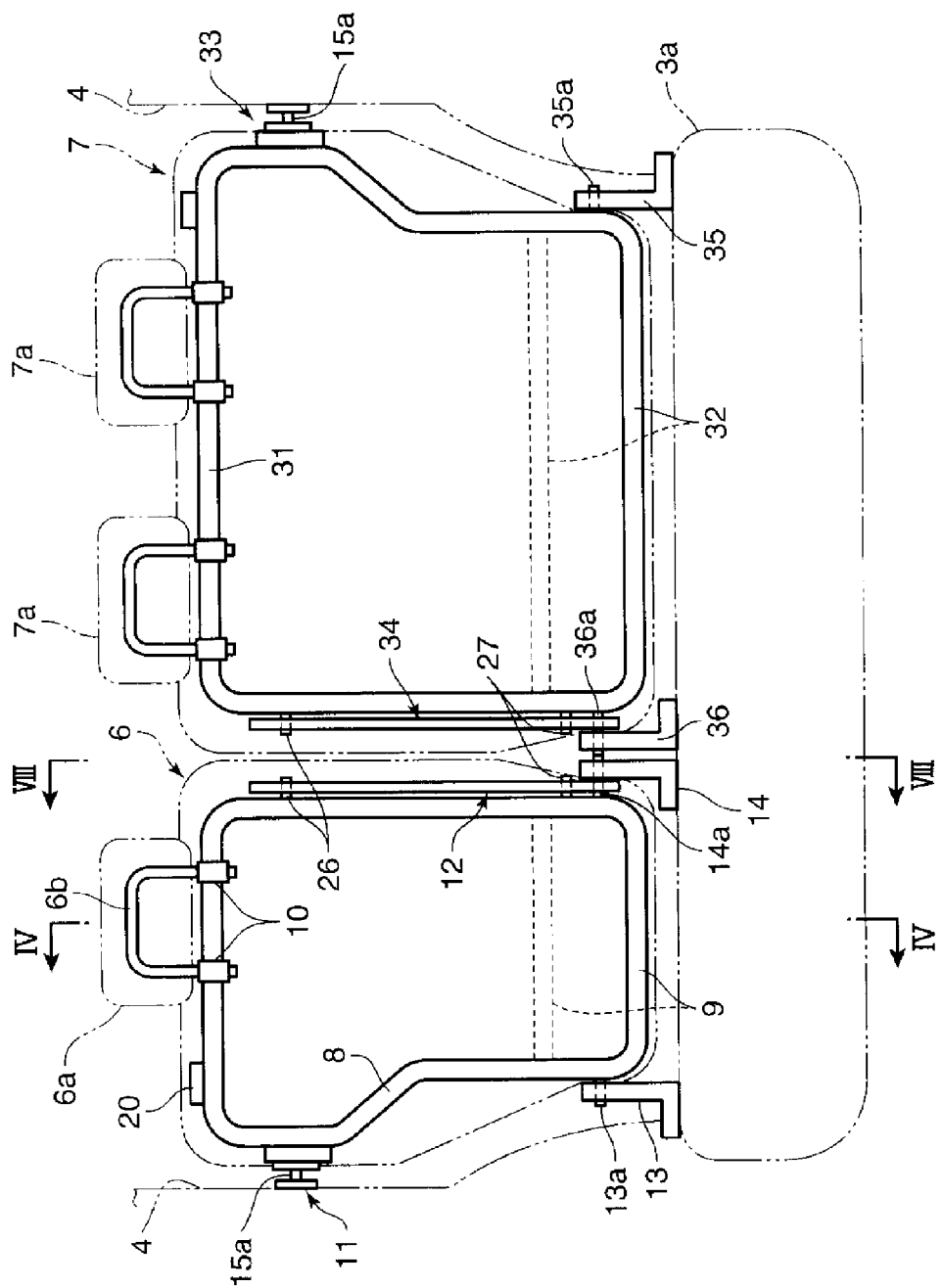
FIG. 3 is an elevation view showing an interior structure of the seat for a passenger.

The above-described rear-row seat for a passenger 3 is a bench type of seat, which comprises a common seat cushion 3a for plural passengers, a seatback for a single passenger 6, and a seatback for two passengers 7 as shown in FIG. 3. The seatback for a single passenger 6 has its width which is available to a single passenger, and a headrest 6a at its upper end portion. Inside the seatback for a single passenger 6 are arranged a reinforcing structure body 8 which reinforces this seatback 6, a back-face plate (not illustrated) which is provided behind the reinforcing structure body 8 and extends along a back face of the seatback 6, and a pressure-receiving portion 9 which is provided so as to move rearwardly by being pressed by a passenger in a vehicle rear collision.

The above-described reinforcing structure body 8 is made of a circular-pipe made seatback frame which bends in a circular shape or a reverse-U shape so as to extend along an outer periphery of the seatback 6, in its elevation view. A holding cylinder 10 into which a support bar 6b of the headrest 6a is inserted is provided at an upper side portion. The pressure-receiving portion 9 which is made of a circular pipe member or the like is arranged at a lower end portion of the above-described reinforcing structure body 8. Herein, the pressure-receiving portion 9 may be arranged above the lower end portion of the reinforcing structure body 8 as shown by a broken line of FIG. 3 instead.

Further, in the vehicle in which a protruding portion is formed at a lower portion of the vehicle-body wall portion 4 so as to correspond to a tire house or the like, part of an outside lower portion of the seatback 6 is concaved toward the center of the vehicle body in order to avoid any interference with the protruding portion, and the reinforcing structure body 8 is also formed in such a manner that it's shape shrinks downwardly in order to correspond to the shape of the seatback 6. Consequently, the lower portion of the reinforcing structure body 8 has its width which is narrower than that of its upper portion in its elevation view.

The reinforcing structure body 8 is supported at a vehicle-body member via first and second connection support portions 11, 12 at both sides of its upper portion. Further, the reinforcing structure body 8 is supported at the floor panel 1 via first and second pivot portions 13, 14 which are made of seat brackets at both sides of its lower portion so as to swing around support axes 13a, 14a of these pivot portions 13, 14. Thus, by swinging the reinforcing structure body 8 around the support axes 13a, 14a in a state in which supporting of the reinforcing structure body 8 by the above-described first connection support portion 11 is released, the seatback 6 of the seat for a passenger 3 is supported so as to take a standing state and a folding state.

The above-described first connection support portion 11 which support a right-side upper portion (an outward side portion) of the reinforcing structure body 8 comprises, as shown in FIG. 5, a striker 15 which is made of a U-shaped member and projects inwardly from the vehicle-body wall portion 4, and a lock bracket 16 which is attached to the reinforcing structure body 8. The lock bracket 16 comprises a slot 17 to receive the striker 15, a latch 18 to hold the striker 15 in the slot 17, and a lock portion 19 to lock the latch 18 at a holding position of the striker 15.

Herein, in case the seatback 6 moves from the folding state (forwardly inclined state) to the standing state, when the slot 17 of the lock bracket 16 which is formed at the seatback 6 is slid around the striker 15 on the vehicle-body side, as shown in FIG. 6, the latch 18 is pushed by the striker 15 so as to move to its holding state, and the latch 18 is held by the lock portion 19 at its holding state. Thus, the striker 15 is held in the slot 17 of the lock bracket 16, so that the above-described reinforcing structure body 8 is connected to and supported at the vehicle-body wall portion 4. Accordingly, the seatback 6 is held at the standing state.

Meanwhile, in case the seatback 6 is not used, a lock releasing lever 20 which is provided at an upper end portion of the reinforcing structure body 8 is operated, so that the lock portion 19 is driven to a lock releasing position of the latch 18 via a cable, not illustrated. Thus, the support state of the reinforcing structure body 8 by the first connection support portion 11 is released, so that the striker 15 can be withdrawn out of the slot 17 of the lock bracket 16 and the seatback 6 in the standing state can be rotated forwardly to the folding state around the support axes 13a, 14a.

Figure 7:
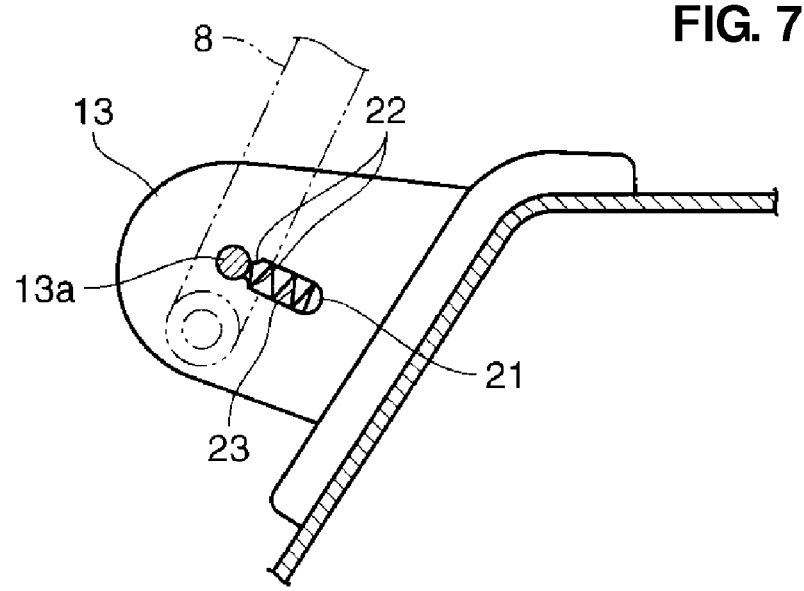
FIG. 7 is a sectional view a first pivot portion and a move-allowance portion.

Further, as shown in FIG. 7, at the first pivot portion 13 which is made of the seat bracket to support the right-side lower portion of the reinforcing structure body 8 at the floor panel 1 is held a support axis 13a which projects outwardly, in the vehicle width direction, from the reinforcing structure body 8. Further, a move-allowance portion 21 which is made of a slot and allows a rear move of the support axis 13a is provided at a wall face of the seat bracket of the first pivot portion 13. This move-allowance portion 21 further includes a projection 22 which holds the support axis 13a at a front end position of the move-allowance portion 21, and a biasing member 23 which is made of a compression coil spring to bias the support axis 13a forwardly.

Figure 4:
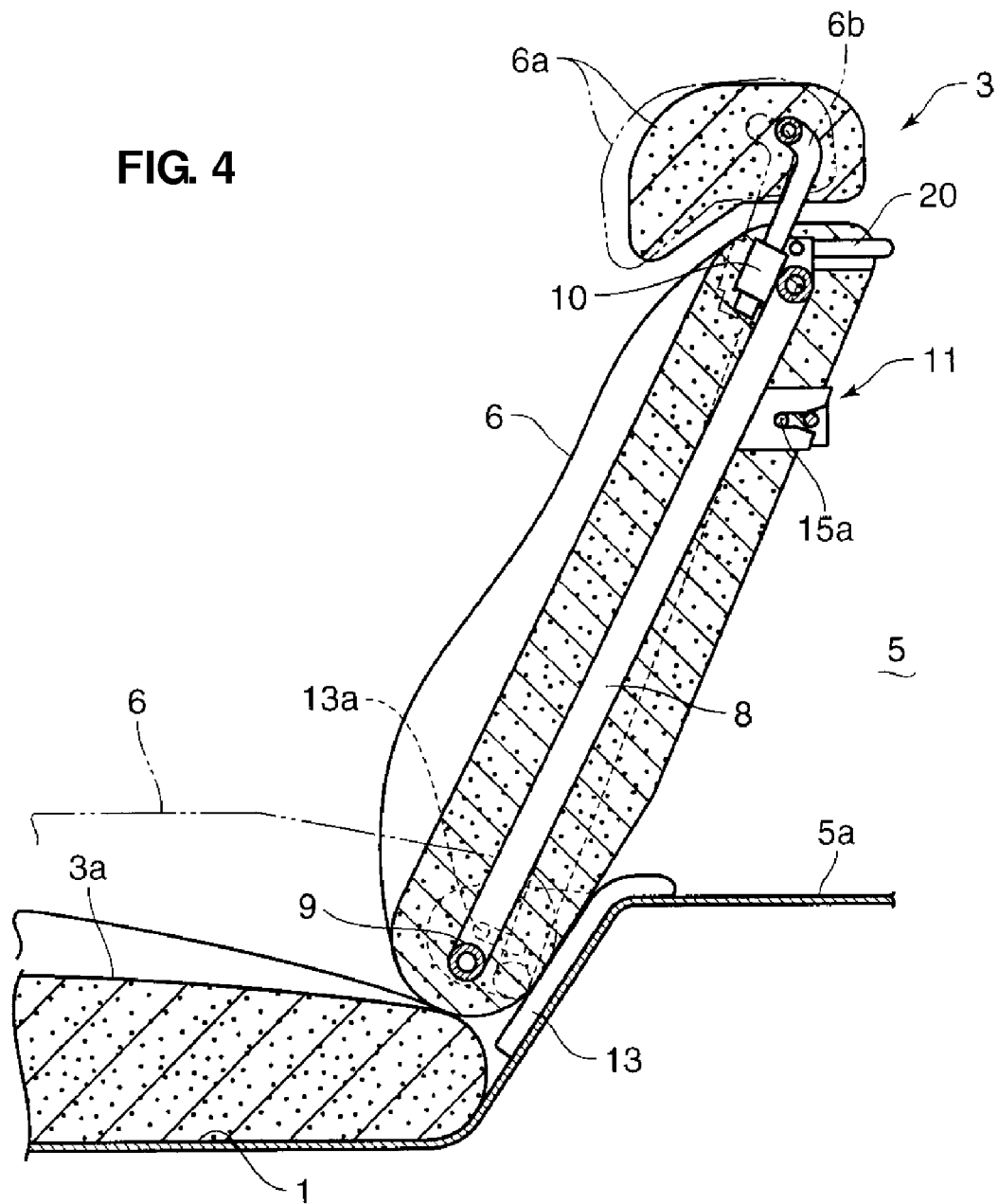
FIG. 4 is a sectional view taken along line IV-IV of FIG. 3.

Herein, when the back portion of the passenger seated on the side of the seatback for a single passenger 6 is pressed against the seatback 6 and thereby the pressure-receiving portion 9 is pushed rearwardly in the vehicle rear collision, the above-described support axis 13a moves rearwardly in the slot of the move-allowance portion 21 over (beyond) the projection 22 and against the biasing force of the biasing member 23. Thus, as shown by a two-dotted broken line in FIG. 4, the reinforcing structure body 8 of the seatback 6 is configured to swing around a connection axis portion 15a of the striker 15 held in the slot 17 of the lock bracket 16, i.e., a horizontal support axis substantially in the vehicle width direction. In accordance with this swinging move of the reinforcing structure body 8, the headrest 6a is allowed to move obliquely forwardly and upwardly.

Figure 8:
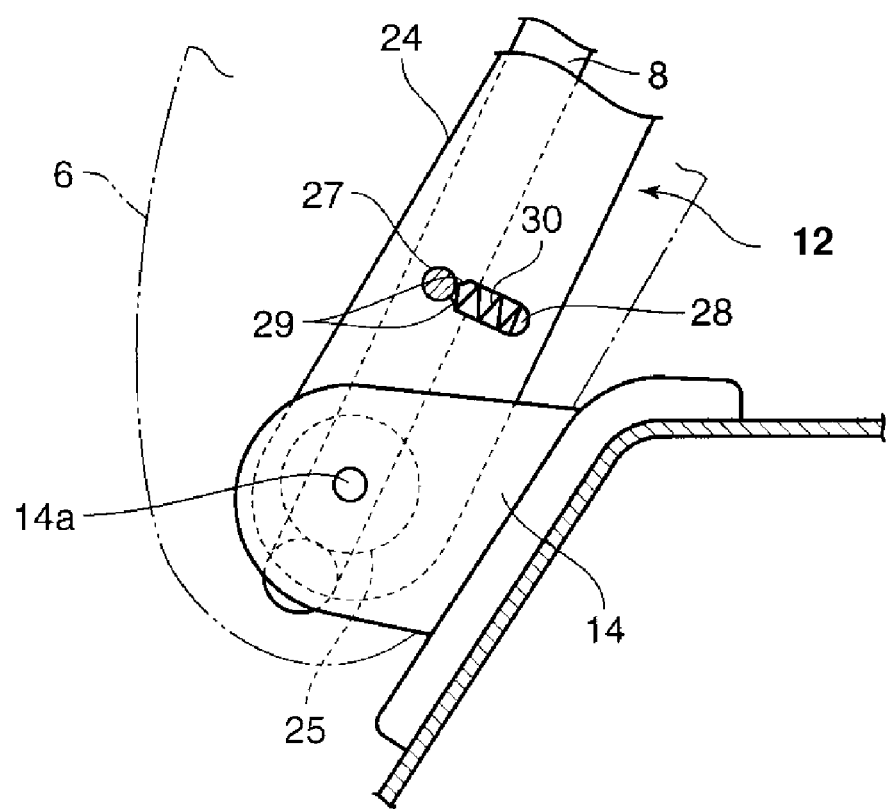
FIG. 8 is a sectional view of a second pivot portion and a move-allowance portion.
Figure 9:
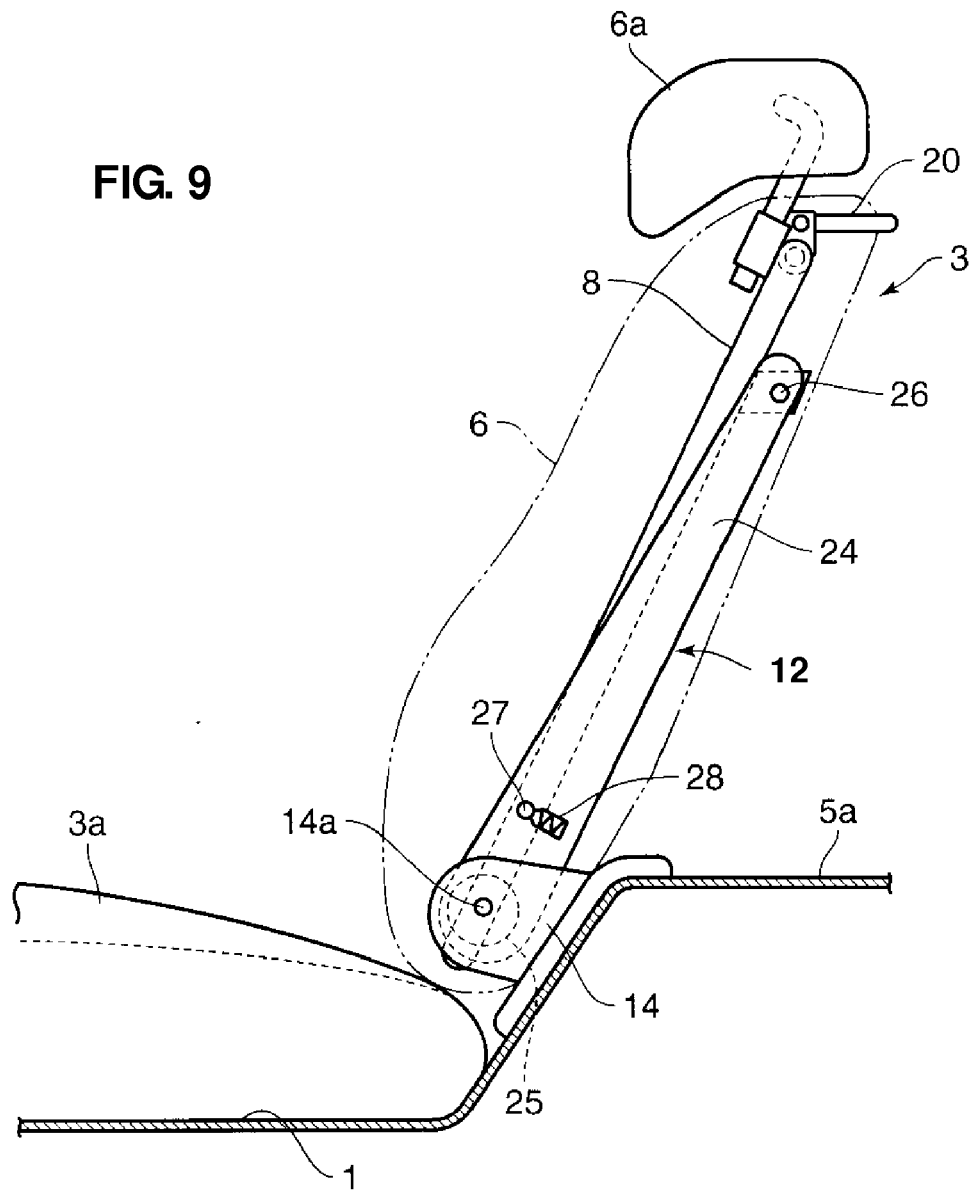
FIG. 9 is a sectional view taken along line VIII-VIII of FIG. 3.

At the second connection support portion 12 which supports the left-side upper portion of the reinforcing structure body 8 is, as shown in FIGS. 8 and 9, provided a support plate 24 which is pivotally supported at the second pivot portion 14 at its lower end portion and extends substantially vertically along a left side portion of the reinforcing structure body 8. In a normal state, the support plate 24 is held at its standing state by a lock mechanism 25 which is provided at the second pivot portion 14. Further, a connection axis portion 26, which projects toward the center in the vehicle width direction from the reinforcing structure body 8 coaxially with the connection axis portion 15a of the striker 15, is formed at an upper portion of the support plate 24.

Moreover, at a specified portion of the support plate 24 which is located near its lower end is provided a move-allowance portion 28 which is made of a slot and supports a horizontal axis portion 27 which projects outwardly so that a rearward move of this horizontal axis portion 27 is allowed, in the vehicle width direction, from the reinforcing structure body 8. This move-allowance portion 28, likewise, further includes a projection 29 which holds the horizontal axis portion 27 at a front end position of the move-allowance portion 28, and a biasing member 30 which is made of a compression coil spring to bias the horizontal axis portion 27 forwardly.

Herein, in case the seatback 6 is moved from the folding state to the standing state, when the lock releasing lever 20 of the first connection support portion 11 is operated, the lock state of the support plate 24 by the lock mechanism 25 of the pivot portion 14 is released concurrently. Thereby, the support plate 24 and the reinforcing structure body 8 swing around the support axis 14a of the pivot portion 14 together, so that the seatback 6 can be moved from the standing state to the folding state.

Herein, in the vehicle rear collision, the above-described horizontal axis portion 27 is pushed back by the pressing force acting on the above-described pressure-receiving portion 9 so as to move rearwardly in the slot of the move-allowance portion 28 over (beyond) the projection 29 and against the biasing force of the biasing member 30. Thus, the reinforcing structure body 8 of the seatback 6 is configured to swing around the connection axis portion 26 of the support plate 24. In accordance with this swinging move of the reinforcing structure body 8, the headrest 6a is allowed to move obliquely forwardly and upwardly.

Herein, the above-described projections 22, 29 may be omitted if the biasing force of the biasing members 23, 30 of the above-described move-allowance portions 21, 28 is strong enough to position the support axis 13a and the horizontal axis portion 26 in their normal state (before the vehicle rear collision) at the front end of the slot of the move-allowance portions 21, 28.

As shown in FIG. 3, the seatback for two passengers 7 is wide enough for two passengers, and has substantially the same structure as the above-described seat for a single passenger 6 except for a pair of headrests 7a, 7a provided at its upper end portion. That is, the seatback for two passengers 7 comprises a reinforcing structure body 31 reinforcing the seatback 7, a back-face plate (not illustrated) which is provided behind the reinforcing structure body 31 and extends along a back face of the seatback 7, and a pressure-receiving portion 32 which is provided so as to move rearwardly by being pressed by the passenger in the vehicle rear collision.

Both-side upper portions of the reinforcing structure body 31 arranged inside the seatback for two passengers 7 are supported at the vehicle-body member (the vehicle-body wall portion 4 and the floor panel 1) via first and second connection supports 33, 34. Both-side lower portions of the reinforcing structure body 31 are supported at the floor panel 1 via first and second pivot portions 35, 36. Thus, the reinforcing structure body 31 can swing around support axes 35a, 36a which are provided at the first and second pivot portions 35, 36.

The first and second connection support portions 33, 34 and the first and second pivot portions 35, 36 have substantially the same structures as those of the first and second connection support portions 11, 12 and the first and second pivot portions 13, 14 of the seatback for a single passenger 6, except for their right-and-left reverse arrangement in an elevation view. Specifically, at the first pivotal portion 35 and the second connection support portion 34 are provided the move-allowance portions 21, 28 which are made of slots which make the reinforcing structure body 31 swing so as to move the headrests 7a, 7a forwardly or upwardly in the vehicle rear collision. Further, at the first connection support portion 33 and the second connection support portion 34 are provided the connection axis portions 15a, 26 which are pivotal points of the reinforcing structure body 31 (see FIGS. 7 through 9).

Herein, in the normal state, the reinforcing structure body 31 swings around the support axes 35a, 36a of the first and second pivot portions 35, 36 in a state in which the connection of the reinforcing structure body 31 to the vehicle-body wall portion 4 at the first connection support portion 33 is released, so that the seatback 7 of the seat for a passenger 3 can be moved to the standing state or the folding state. Meanwhile, in the vehicle collision state, the support axis 35a and the horizontal axis portion 27 which are provided at the lower portion of the reinforcing structure body 31 move rearwardly along the slots of the move-allowance portions 21, 28, so that the headrests 6a, 7a can be moved forwardly or upwardly so as to support the passenger's head portion properly.

Figure 10:
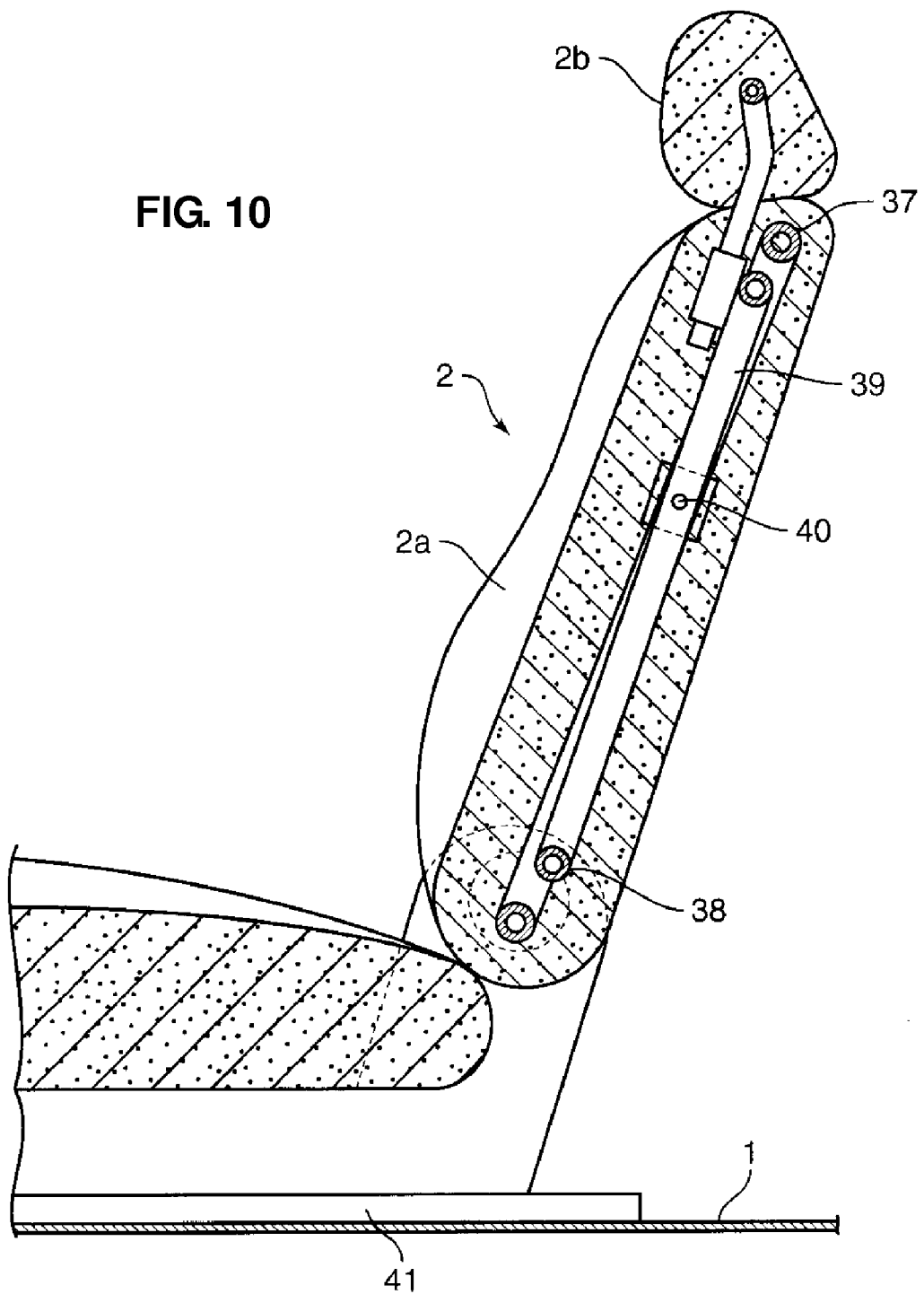
FIG. 10 is a sectional view of a first seat.

Meanwhile, at the front-row seat 1 which is arranged in front of the seat for a passenger 3 and comprises the driver's seat and the assistant's seat are provided, as shown in FIG. 10, a reinforcing structure body 37 which is made of a seatback frame which is made of a circular pipe and extends along an outer periphery of the seatback 2a, and a pressure-receiving portion 38 which is supported so as to move rearwardly by being pressed by a passenger in the vehicle rear collision. The front-row seat 2 is supported so as to move longitudinally along a seat rail 41 which is disposed on the floor panel 1, so that any connection support portion which connects the reinforcing structure body 37 at the seatback 2a of the front-row seat 2 to the vehicle-body wall portion 4 is not provided. Thus, the front-row seat 2 is different from the above-described seat for a passenger 3 in providing no connection support portion.

Further, a connection frame 39 which connects the headrest 2b and the above-described pressure-receiving portion 38 is arranged inside the reinforcing structure body 37 of the seatback 2a of the front-row seat 2. This connection frame 39 is supported so as to swing around a support axis 40 which is provided at the reinforcing structure body 37. Herein, in the vehicle rear collision, the connection frame 39 swings around the support axis 40 in accordance with the pressing force acting on the pressure-receiving portion 38, so that the headrest 2b can be moved forwardly or upwardly.

The seat device for a vehicle described above comprises the seat for a passenger 3, the seat 3 including the seatbacks 6, 7 to support the passenger's back portion, the reinforcing structure bodies 8, 31 provided along the outer periphery of the seatbacks 6, 7, the headrests 6a, 7a provided at the upper portion of the reinforcing structure bodies 8, 31 to support the passenger's head portion, the connection support portions 11, 12, 33, 34 provided beside the reinforcing structure bodies 8, 31 to connect the reinforcing structure bodies 8, 31 to the vehicle-body members (the vehicle-body wall portion 4 and the floor panel 1) so as to support the reinforcing structure bodies 8, 31 at the vehicle-body members 4, 1, and the move-allowance portions 21, 28 allowing the lower portions of the reinforcing structure bodies 8, 31 to move rearwardly in the vehicle rear collision so that the headrests 6a, 7a move forwardly or upwardly. According to the above-described seat device for a vehicle, the passenger's head portion can be protected effectively with the simple structure, without deteriorating good appearances.

That is, at the seatback for a single passenger 6 of the seat for a passenger 3, the both-side upper portions of the reinforcing structure body 8 are supported at the first connection support portion 11 which is arranged at one outward side portion of the reinforcing structure body 8 and the second support portion 12 which is arranged at the other side portion of those, respectively. Accordingly, when the pressure-receiving portion 9 provided at the lower portion of the reinforcing structure body 8 is pressed rearwardly by the back portion of the passenger seated in the seat for a passenger 3, the reinforcing structure body 8 is moved so as to swing, so that the headrest 6a can be securely moved forwardly or upwardly.

Further, good appearances may not be deteriorated, unlike the above-described prior art in which the headrest reclining device is provided at the rear parcel. Moreover, since the reinforcing structure body 8 of the seatback 6 is simply arranged so as to swing, the seat for a passenger 3 may not have improperly complex structure, unlike the above-described front-row seat 2 equipped with the driver's seat and the assistant's seat in which the connection frame 39 connecting the headrest 2b and the pressure-receiving portion 38 is arranged inside the reinforcing structure body 37 of the seatback 2a, and this connection frame 39 is supported so as to swing. Thus, the passenger's head portion can be stably protected by the headrest 6a moved forwardly or upwardly with the simple structure in the vehicle rear collision. The seatback for two passengers 7 of the seat for a passenger 3 can provide the above-described advantages described for the seatback for a single 6 as well.

Further, according to the above-described embodiment, the move-allowance portion 21 which is made of the slot is provided at the first pivot portions 13, 35 which are made of the seat brackets which pivotally support the seatbacks 6, 7. Thereby, since the seatbacks 6, 7 swing around the support axes 14a, 35a of the first pivot portions 13, 35 in the normal state, they can be moved so as to take their folding state and their standing state. In the vehicle rear collision, meanwhile, since the lower portions of the reinforcing structure bodies 8, 31 are moved rearwardly along the move-allowance portion 21 provided at the above-described pivot portions 13, 35 by the pressing force acting on the above-described pressure-receiving portions 9, 32, the headrests 6a, 7a can be securely moved forwardly or upwardly with the simple structure, so that the passenger's head portion can be protected effectively.

Moreover, according to the present embodiment, the above-described first connection support portions 11, 33 comprise the striker 15 which is provided at the vehicle-body member (vehicle-body wall portion 4) and the lock bracket 16 which is provided at the reinforcing structure bodies 8, 31 of the seatbacks 6, 7. Thereby, the first connection support portions 11, 33 can be formed at a low cost by using goods on the market, and the reinforcing structure bodies 8, 31 and the vehicle-body member can be connected easily and properly.

Herein, in place of the above-described embodiment in which the striker 15 is provided at the vehicle-body wall portion 4 of the vehicle side panel ant the lock bracket 16 is provided at the reinforcing structure bodies 8, 31, an arrangement of the striker and the lock bracket may be reversed. That is, the lock bracket may be provided at the reinforcing structure bodies 8, 31, and the lock bracket may be provided at the vehicle-body wall portion 4 of the vehicle side panel.

Also, as shown in the above-described embodiment, the first connection support portions 11, 33 which connect the reinforcing structure bodies 8, 31 to the vehicle-body wall portion 4 are provided at one side of the reinforcing structure bodies 8, 31, and the second connection support portions 12, 34 which connect the reinforcing structure bodies 8, 31 to the floor panel 1 are provided at the other side of the reinforcing structure bodies 8, 31. Thereby, the reinforcing structure bodies 8, 31 can be stably supported at its both sides. Further, the reinforcing structure bodies 8, 31 can be moved smoothly by the pressing force acting on the pressure-receiving portions 9, 32. Accordingly, the headrests 6a, 7a can be more securely moved forwardly or upwardly, so that the passenger's head portion can be protected more effectively.

Further, according to the above-described embodiment, the second connection support portions 12, 34 are supported at the floor panel 1 via the second pivot portions 14, 36 to pivotally support the seatbacks 6, 7. Thereby, the other side of the reinforcing structure bodies 8, 31 which are not supported at the vehicle-body wall portion 4 by using the second pivot portions 14, 36 can be supported stably and with a simple structure via the second connection support portions 12, 34.

For example, the support plate 24 of the second connection support portion 12 is provided so as to extend vertically along the left side portion of the seat for a single passenger 6, and the other side portion of the reinforcing structure body 8 is supported by the support plate 24 in a state in which the lower end portion of the support plate 24 is held in its standing state via the lock mechanism 25 provided at the second pivot portion 14 of the seat bracket. This support plate 24 is supported at the floor panel 1 via the second pivot portion 14 to pivotally support the seatback 6. Thereby, the other side portion of the reinforcing structure body 8 which is not supported at the vehicle-body wall portion 4 can be stably supported, and the reinforcing structure body 8 can be moved so as to swing in the vehicle rear collision.

Moreover, according to the above-described embodiment, the move-allowance portion 28 of the slot which allows the lower portion of the reinforcing structure body 8 to move rearwardly is provided at the second connection support portion 12 to support the other side portion of the reinforcing structure body 8. Thereby, the reinforcing structure body 8 can be supported stably via the second connection support portion 12 in the normal state. In the vehicle rear collision, the lower portion of the reinforcing structure body 8 is allowed to move rearwardly so that the headrest 6a can be securely moved forwardly or upwardly. Consequently, the passenger's head portion can be protected more effectively.

Especially, in case the support axis 13a and the horizontal axis portion 27 which are provided at the lower portion of the reinforcing structure bodies 8, 31 are held at the front end positions of the move-allowance portions 21, 28 by the projections 22, 29 formed at the move-allowance portions 21, 28 and the biasing members 23, 30 of the compression coil spring, the lower portions of the reinforcing structure bodies 8, 31 can be stably supported at the first and second connection support portions 11, 12 in the normal state. Thus, the support rigidity of the reinforcing structure bodies 8, 31 can be secured.

Embodiment 2

Figure 11:
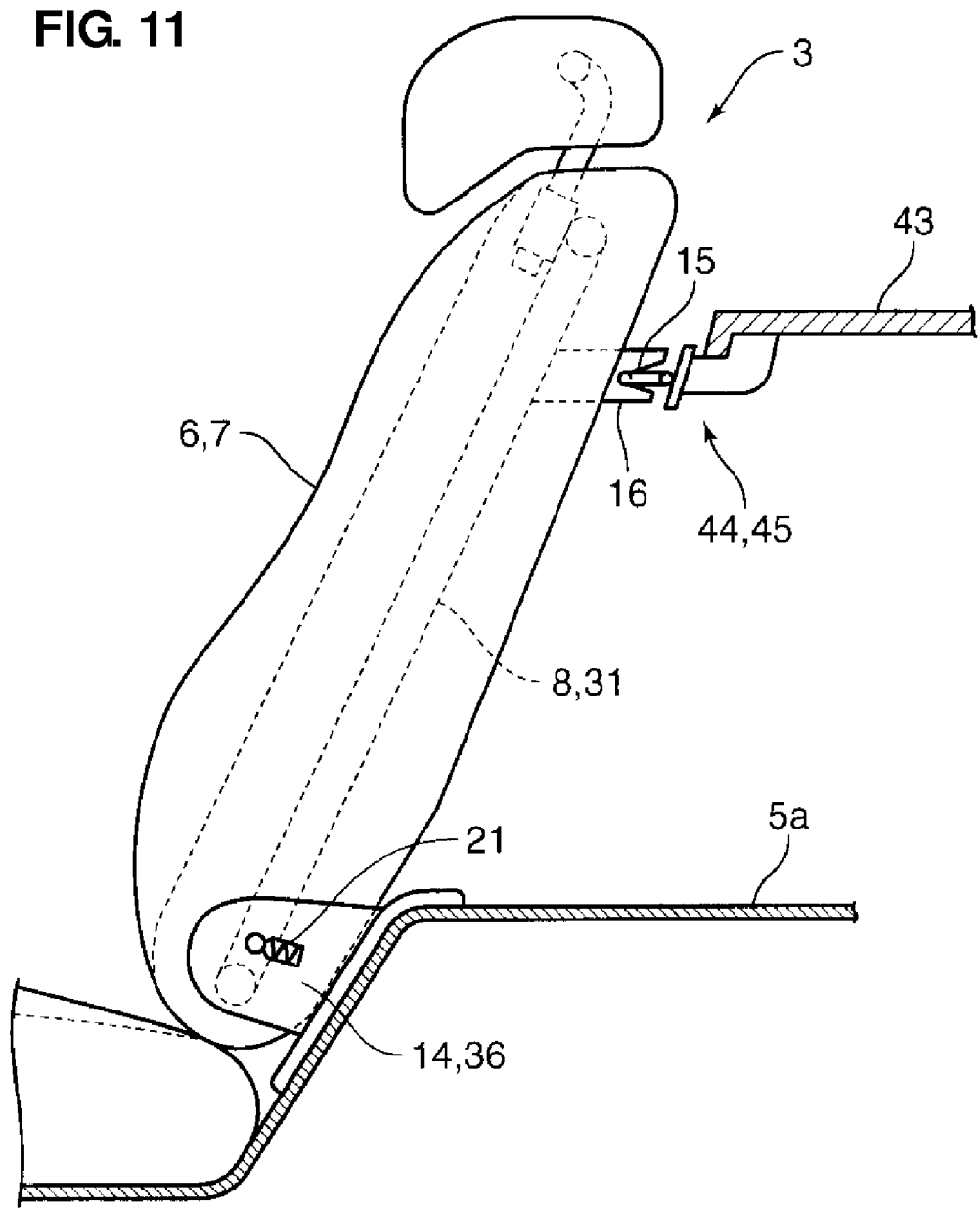
FIG. 11 is a side view showing a second embodiment of the present invention.
Figure 12:
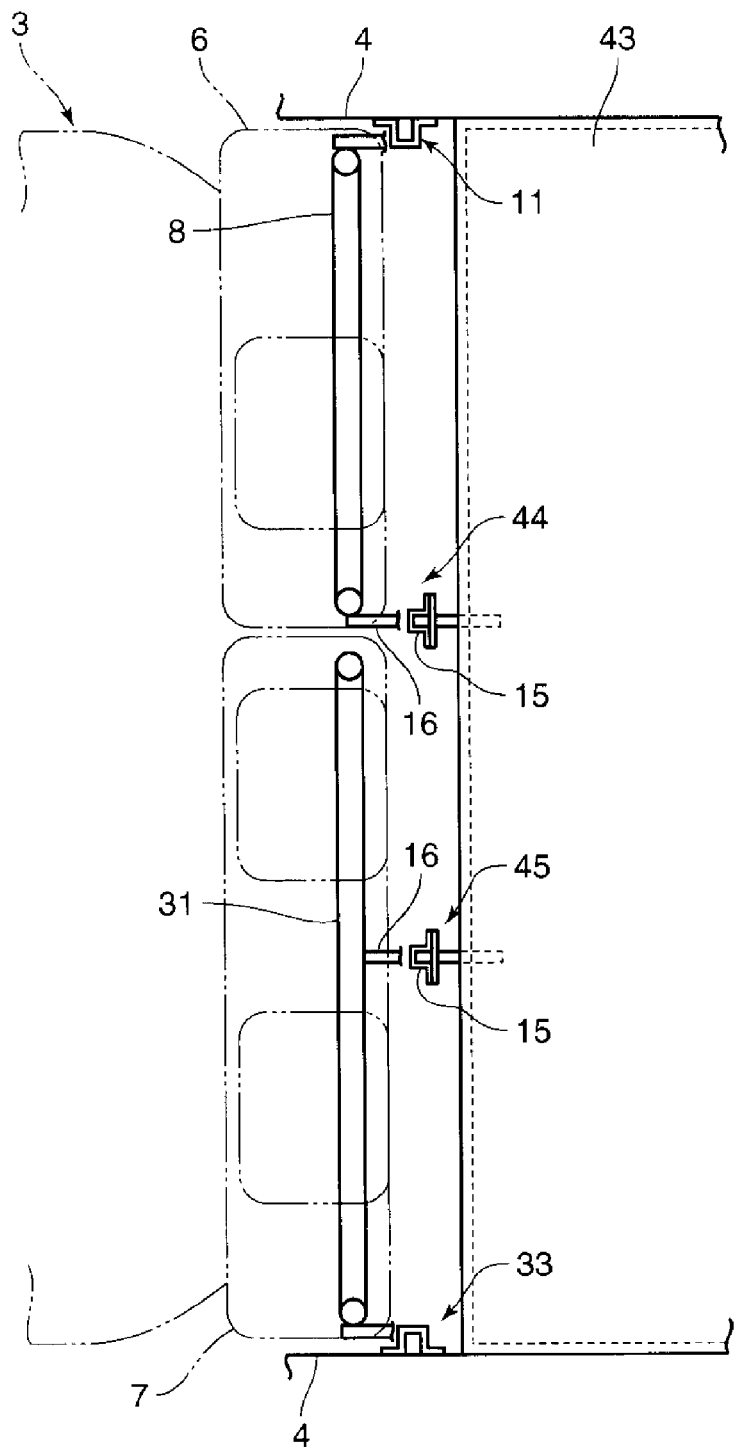
FIG. 12 is a plan view showing the second embodiment of the present invention.

In place of the above-described first embodiment in which the other side portions of the reinforcing structure bodies 8, 31 are supported by the second connection support portions 12, 34 which comprise the support plate 24, a second embodiment shown in FIGS. 11 and 12 may be applied. In the second embodiment, in a vehicle, such as a sedan type of vehicle, in which a package tray 43 is provided behind the seat 3, there are provided second connection support portions 44, 45 which comprise strikers 15 which are provided at the vehicle-body wall portion of the package tray 43 and lock brackets 16 which are provided at the side portion of the reinforcing structure body 8 and the central portion of the reinforcing structure body 31, for example.

In this case, by omitting the above-described support plate 24, the structure of the second connection support portion can be simple, and the other side end portions of the reinforcing structure bodies 8, 31 which are located inwardly in the vehicle width direction can be stably supported. Further, by providing the move-allowance portion 21 of the slot, which may be the same as the first pivotal portions 13, 35, at wall faces of the second pivot portions 14, 36 of the seat brackets which support the lower portions of the reinforcing structure bodies 8, 31, the rearward move of the lower portions of the reinforcing structure bodies 8, 31 in the vehicle collision can be allowed.

The present should not be limited to the above-described embodiments, and any other modifications or improvements can be applied within the scope of a sprit of the present invention.

For example, while the above-described reinforcing structure bodies 8, 31 are made of the pipe made seatback frames which bend so as to extend along the outer peripheries of the seatbacks 6, 7 in the above-described embodiments, the reinforcing structure bodies to reinforce the seatbacks 6, 7 may be constituted by arranging plate members which have substantially the same shapes as those of the seatbacks 6, 7 in the elevation view, and the above-described pivot portions and connection support portions may be arranged by using bead-shaped reinforcing portions or the like which are provided at these reinforcing structure bodies. In this case, the pressure-receiving portions and the headrest moving-mechanism portions may be provided in front of the above-described plate members. Further, the number of passengers available for the seat 3 or the number of headrests 6a, 7a should not be limited to those described in the above-described embodiments, and any modifications are available.

What is claimed is:

1. A seat device for a vehicle, comprising:
a seat for a passenger, the seat including a seatback to support a passenger's back portion;
a reinforcing structure body provided inside seatback of said seat, extending along an outer periphery of the seatback, said reinforcing structure body including an upper portion, a lower portion, and a side portion extending between said upper portion and said lower portion;
a headrest provided at the upper portion of said reinforcing structure body to support a passenger's head portion;
a connection support portion provided beside said reinforcing structure body at a position in a vertical direction between the upper portion and the lower portion to connect said reinforcing structure body to a vehicle-body member so as to support the reinforcing structure body at the vehicle-body member, the connection support portion including a pivotally-supporting portion to pivotally support the reinforcing structure body at the vehicle-body member around a pivotal axis thereof, the pivotal axis of the pivotally-supporting portion being configured such that a position of the pivotal axis does not move rearwardly relative to the vehicle-body member; and
a move-allowance portion allowing a lower portion of said reinforcing structure body to move rearwardly relative to the vehicle-body member,
whereby when the seatback is pressed rearwardly by the passenger's back portion in a vehicle rear collision, the reinforcing structure body of the seat is rotatable around the pivotal axis of the pivotally-supporting portion of the connection support portion such that the upper portion of the reinforcing structure body with the headrest moves forwardly, the lower portion of the reinforcing structure body moves rearwardly and the pivotal axis of the pivotally-supporting portion does not move rearwardly relative to the vehicle-body member, so that said headrest moves forwardly or upwardly.

2. The seat device for a vehicle of claim 1, wherein said reinforcing structure body is supported on a vehicle-body side via a pivot portion of the seatback, and said move-allowance portion is provided at the pivot portion.

3. The seat device for a vehicle of claim 2, wherein said connection support portion comprises a striker which is provided at any one of said reinforcing structure body and the vehicle-body member and a lock bracket which is provided at the other of those.

4. The seat device for a vehicle of claim 3, wherein said lock bracket comprises a slot to receive the striker, a latch to hold the striker in the slot, and a lock portion to lock the latch at a holding position of the striker.

5. The seat device for a vehicle of claim 1, wherein said connection support portion comprises a striker which is provided at any one of said reinforcing structure body and the vehicle-body member and a lock bracket which is provided at the other of those.

6. The seat device for a vehicle of claim 5, wherein said lock bracket comprises a slot to receive the striker, a latch to hold the striker in the slot, and a lock portion to lock the latch at a holding position of the striker.

7. A seat device for a vehicle, comprising:
- a seat for a passenger, the seat including a seatback to support a passenger's back portion;
- a reinforcing structure body provided inside seatback of said seat along an outer periphery of the seatback;
- a headrest provided at an upper portion of said reinforcing structure body to support a passenger's head portion;
- a connection support portion provided beside said reinforcing structure body to connect said reinforcing structure body to a vehicle-body member so as to support the reinforcing structure body at the vehicle-body member; and
- a move-allowance portion allowing a lower portion of said reinforcing structure body to move rearwardly in a vehicle rear collision so that said headrest moves forwardly or upwardly,
- wherein said connection support portion comprises a first connection support portion to connect the reinforcing structure body to a vehicle-body wall portion so as to support the reinforcing structure body at the vehicle-body wall portion and a second connection support portion to connect the reinforcing structure body to a floor panel so as to support the reinforcing structure body at the floor panel, the first and second connection portions being arranged beside said reinforcing structure body on the opposite sides to each other in a vehicle width direction.

8. The seat device for a vehicle of claim 7, wherein said reinforcing structure body is supported at the floor panel via a pivot portion of the seatback, and said second connection support portion is supported at the floor panel via said pivot portion.

9. The seat device for a vehicle of claim 8, wherein said move-allowance portion is provided at said second connection support portion.

10. A seat device for a vehicle, comprising:
- a seat for a passenger, the seat including a seatback to support a passenger's back portion;
- a reinforcing structure body provided inside seatback of said seat along an outer periphery of the seatback;
- a headrest provided at an upper portion of said reinforcing structure body to support a passenger's head portion;
- a connection support portion provided beside said reinforcing structure body to connect said reinforcing structure body to a vehicle-body member so as to support the reinforcing structure body at the vehicle-body member; and
- a move-allowance portion allowing a lower portion of said reinforcing structure body to move rearwardly in a vehicle rear collision so that said headrest moves forwardly or upwardly,
- wherein said connection support portion comprises a first connection support portion to connect the reinforcing structure body to a vehicle-body side wall portion so as to support the reinforcing structure body at the vehicle-body side wall portion and a second connection support portion to connect the reinforcing structure body to a rear package tray arranged in back of the seat for a passenger so as to support the reinforcing structure body at the rear package tray.

* * * * *